M. V. B. JOHNSON.
Domestic Boiler.
No. 103,468.  Patented May 24, 1870.
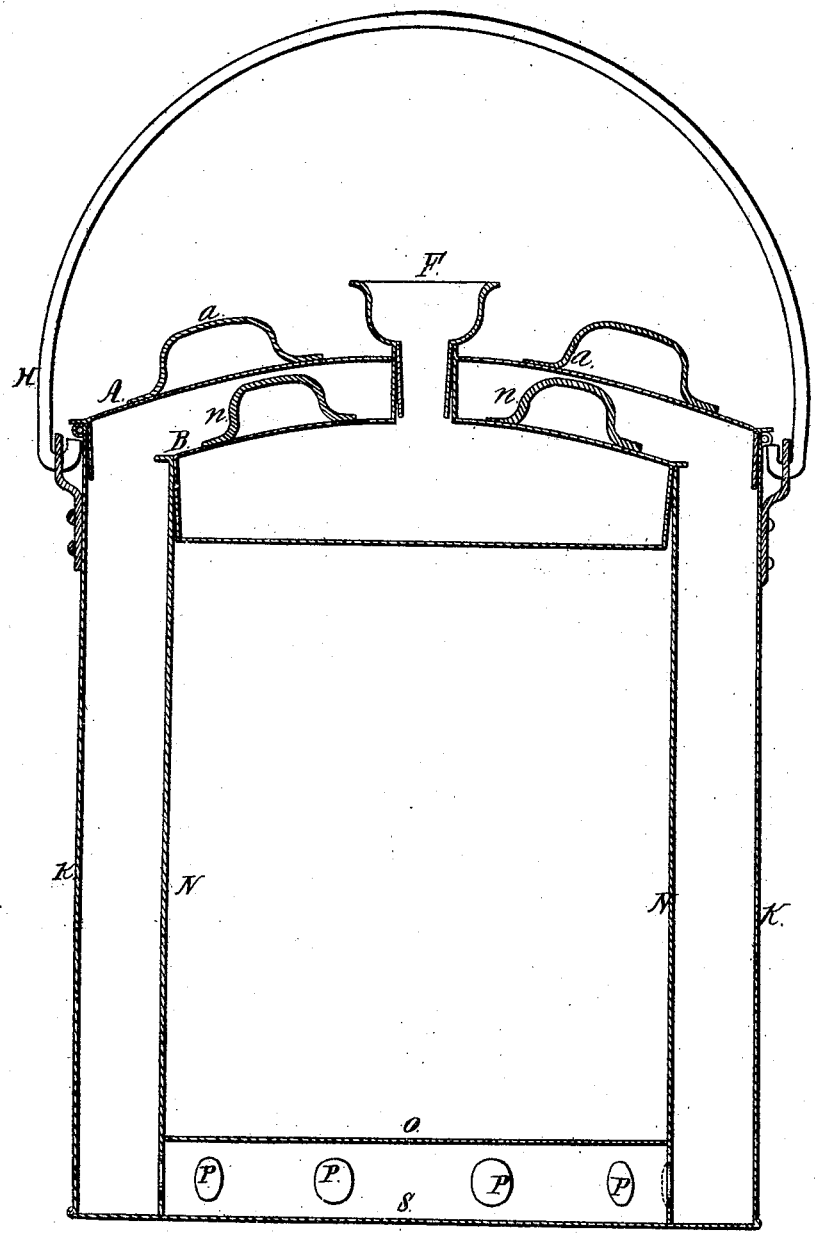
Witnesses:
H. Martin Williams.
Luther Wagoner
Inventor:
Dr. M. Van B. Johnson

United States Patent Office.

MARTIN VAN B. JOHNSON, OF HOLDEN, MISSOURI.

Letters Patent No. 103,468, dated May 24, 1870.

COOKING VESSEL.

The Schedule referred to in these Letters Patent and making part of the same.

I, MARTIN VAN B. JOHNSON, of Holden, in the county of Johnson and State of Missouri, have invented a new Stew-pan or Cooking Vessel, of which the following is a specification.

Nature and Objects of the Invention.

My invention relates to the combination of two sheet-metal vessels, so as to form a new and useful vessel or device for cooking, whereby any vegetables or meats may be cooked without danger of burning.

Description of the Accompanying Drawing.

The accompanying drawing is a vertical cross-section of the stew-pan or cooking-vessel.

General Description.

K K S are the outer walls of a vessel to be constructed of metal, substantially of the form shown in the drawing.

A is a lid or cover, fitting over the said vessel K K S.

N N is the outer wall of a vessel similar to K K S.

O is a bottom to the vessel N N, which bottom O is placed at a sufficient distance from the bottom of the outer vessel K K S to permit the holes P to be perforated in sides N N.

B is a lid or cover fitting in or over the top of the vessel N N.

Said lid B is provided with a side and bottom, to admit of its being filled with water.

F is funnel, through which water may be conducted into the said lid B.

G G $n\ n$ are slips or rings of metal, which serve as handles to their respective lids.

H is a bail, by which the whole vessel may be suspended or carried.

The articles to be cooked are introduced into the interior vessel N N. The annular space between the two walls K K and N N is then filled with water.

The lids A and B are placed in their respective positions, as shown in the drawing, and cold water is introduced into the interior of the lid B, through the funnel F, for the purpose of condensing the steam which may be generated in the vessel N N, when necessary to prevent the steam forcing off the said lid B.

Claim.

I claim as my invention—

The combination of the two vessels K K S and N N with their respective lids A and B and the funnel F, substantially as and for the purpose hereinbefore set forth.

MARTIN VAN B. JOHNSON.

Witnesses:
H. MARTIN WILLIAMS,
J. W. WALLACE.